UNITED STATES PATENT OFFICE.

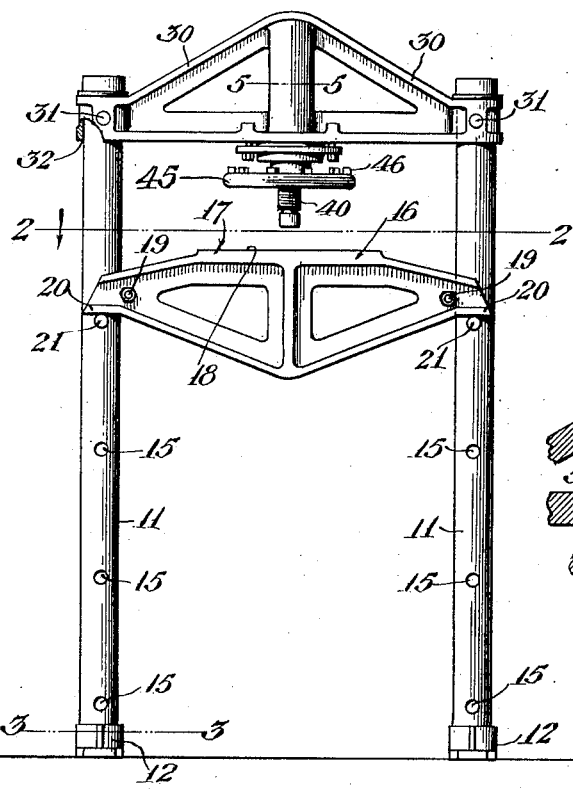

ROBERT CRAIG, OF BERKELEY, CALIFORNIA.

SCREW-PRESS.

1,358,418.  Specification of Letters Patent.  Patented Nov. 9, 1920.

Application filed February 8, 1919. Serial No. 275,905.

*To all whom it may concern:*

Be it known that I, ROBERT CRAIG, a citizen of the United States, residing at Berkeley, in the county of Alameda, State of California, have invented a new and useful Screw-Press, of which the following is a specification.

My invention relates to screw presses such as are commonly used for the purpose of exerting pressure on machine elements.

The object of the invention is to provide a screw press which will be adjustable for different heights of work and which will be very powerful and speedy in operation. Such a press finds a peculiar utility in connection with automobile manufacturing or repairs.

A further object of the invention is to provide a press which can be cheaply manufactured due to the absence of machined parts and due further to the efficient utilization of materials.

Referring to the drawings, which are for illustrative purposes only,

Figure 1 is a side elevation of a press embodying my invention.

Fig. 2 is a section on a plane represented by the line 2—2 of Fig. 1.

Fig. 3 is a section on a plane represented by the line 3—3, Fig. 1.

Fig. 4 is a vertical section through a portion of the head, the screw and the hand wheel.

Fig. 5 is a partial section on a plane represented by the line 5—5, Fig. 1.

Fig. 6 is a perspective view of the thrust plate and a portion of the wheel.

Fig. 7 is a plan view of the wheel and wrench in their operative relationship.

The press consists of a pair of standards 11 which are formed of standard pipe, the lower end of each of which fits into a cored cavity in a shoe 12. These cavities are somewhat larger in diameter than the pipe 11, and a lead ring or a collar 13 is cast and shrunk in this cavity around the lower end of each of the pipes 11 for the purpose of securing them in place.

The shoes 12 are made entirely of cast iron and have no machine work thereon, holes 14 being cored for lag screws or bolts by means of which they may be readily secured to the floor. Each of the members 11 is provided with a plurality of driller holes 15 which are placed at various heights from the floor. A table 16 is provided, this table consisting of two steel or cast members 17 having a working surface 18, the members being secured together and spaced apart by means of bolts 19 each having a pipe spacer 25 carried thereon. Each of the members 17 has a projection 20 at either end thereof which extends out and rests upon pins 21 which may be placed in any of the holes 15. The members 17 are so placed that an opening 22 is left between them through which the mandrel, shaft or pin which it is desired to press out may be forced, the pulley, bushing or other device from which it is desired to press the shaft or pin resting on the surfaces 18 or upon members resting on these surfaces.

The upper end of the standards 11 fit into cavities in a head 30, being secured therein by means of pins 31 and by lead 32 which is cast and shrunk around the standards 11. The head 30 is provided with a cored central cavity 35 which is provided with two grooves or slots 36 at either side thereof diametrically opposite each other. A machined screw 40 is placed in this cavity, this screw having a pin 41 which projects out from either side thereof into the slots 36 for the purpose of preventing the screw from turning, it being of course free to slide longitudinally in the opening 35. The upper portion of the screw 40 is turned down as shown in Fig. 4.

Threaded with a left hand thread on the screw 40 is a wheel 45, this hand wheel being provided with projections 46 on the upper surface thereof so that it can be readily engaged by a wrench or bar 42. The left hand thread is used for the purpose of making the direction of rotation of the wheel 45 seem natural to an operator. Secured to the upper end of the hub of the wheel 45 is a thrust plate 50, this plate having spiral oil grooves, being of a slightly larger diameter than the end of the hub and fitting inside an operating plate 51 which is secured by means of screws 52 to the head 30. The plate 51 serves to restrain the wheel 45 from any longitudinal movement so that as the wheel 45 is turned the screw 40 is moved up and down with relation to the head.

The method of operation is as follows:

The table 16 is secured at any desired height, resting upon the pins 21 which can be set in any of the holes 15. It is thus possible to operate with a comparatively short screw 40 and at the same time take work of various heights. The work to be operated on is placed on the surface 18 or upon pieces laid upon this surface and the wheel 45 is turned to force the screw 40 downwardly or to retract it. On light work the wheel 45 may be readily turned by grasping the rim by the hand, but when heavy pressures are to be exerted the wrench 42 is used. This wrench fits around the hub of the wheel 45 and rests against one of the projections 46. As soon as the wheel has been turned a certain distance the bar is lifted over the projection so that it will engage the next one.

The press may be used for a great number of purposes as will be evident to any one skilled in the machinist art and may be used for other purposes than the manufacture and repair of automobiles although it is especially adapted to this purpose.

What I claim is:—

1. In a screw press a standard composed of a pipe section; a shoe having a cored cavity into which the lower end of said pipe fits; a head having a cored cavity into which the upper end of said pipe fits; and a pin passing through said pipe on which one end of a table may be supported.

2. In a screw press a table formed of two cast members permanently bolted together so that they may be moved as a unit; pipe standards located between the ends of said members; and pins extending through said pipe standards and upon which said table may rest.

In testimony whereof I have hereunto set my hand at Los Angeles, California, this 31st day of January, 1919.

ROBERT CRAIG.